United States Patent [19]
Yokota

[11] Patent Number: 5,209,447
[45] Date of Patent: May 11, 1993

[54] COVER STRUCTURE FOR SLIDE RAIL IN SEAT ADJUSTER

[75] Inventor: Masaaki Yokota, Akishima, Japan
[73] Assignee: Tachi-S Co., Ltd., Akishima, Japan
[21] Appl. No.: 780,363
[22] Filed: Nov. 15, 1991
[51] Int. Cl.⁵ .......................................... F16M 13/00
[52] U.S. Cl. ................................. 248/429; 297/346
[58] Field of Search .............. 248/429, 430; 296/65.1; 297/317, 346, 473, 468, 344

[56] References Cited

U.S. PATENT DOCUMENTS

| | | | |
|---|---|---|---|
| 4,582,361 | 4/1986 | Kennel | 297/452 X |
| 4,601,517 | 7/1986 | Heesch | 297/452 X |
| 4,722,573 | 2/1988 | Komohara | 297/468 |
| 5,039,166 | 8/1991 | Kojho | 297/344 X |
| 5,087,009 | 2/1992 | Borlinghaus | 248/429 |

FOREIGN PATENT DOCUMENTS 26139  2/1987  Japan ................... 248/429

Primary Examiner—J. Franklin Foss
Attorney, Agent, or Firm—Oldham, Oldham & Wilson Co.

[57] ABSTRACT

A cover structure for covering a slide rail of a seat adjuster, wherein there is provided cover member extending over a required length of lower rail and its rearward end side as well as the leg support member fixed to the lower rail. An integral covering lug of the cover member overlies a head of rivet adjacent the rearward end of cover member.

4 Claims, 4 Drawing Sheets

COVER STRUCTURE FOR SLIDE RAIL IN SEAT ADJUSTER

BACKGROUND OF INVENTION

1. Field of the Invention

The present invention relates to a structure of a cover member which covers a slide rail in a seat adjuster for adjusting the fore-and-aft positions of a vehicle seat, which is provided between the seat and floor of vehicle or automobile.

2. Description of Prior Art

A seat adjuster for adjustment of seat position in the fore-and-aft direction within a cabin of automobile is widely available in order for an occupant on the seat to locate the seat at his or her desired position or to move the seat forwardly for allowing another occupant to enter into a rear seat.

An example of conventional seat adjuster of this kind is shown in FIGS. 1 and 2. This seat adjuster (2) is adapted for adjusting the fore-and-aft position of a seat (1). FIG. 1 depicts a rearward side of the seat (1) wherein it can be seen that a pair of upper rails (5)(5) fixed to the seat (1) is fitted slidably in the respective pair of lower rails (4)(4) and that the lower rails (4)(4) are fixed via the respective support legs members (3) to a floor side of an automobile (not shown). Referring to FIG. 2, a cover member (6) of cap type is fitted onto the rearward end edge (4a1) of the lower rail (4), as indicated by the phantom line. The purpose of such cover member (6) is for avoiding a contact of shoes toe of an occupant on a rear seat with such rearward end edge (4a1) of lower rail (4), so that when the upper rail (5) is moved forwardly, leaving the rearward part (4a) of mating lower rail (41) exposed from the seat (1), the edge (4a1) in question are protected by the cover member (6) against damage such as kick from the shoes toe of that rear-seat occupnat.

This covering arrangement for the lower rail rearward edge (4a1) may certainly be valued in terms of its protection and improvement in outer appearance of the rearward part (4a) of lower rail (4), but it has been found defective that a rivet (7a), which firmly connects together the lower rail rearward part (4a) and support leg member (3), is not concealed by the cover member (6), thus resulting in exposure of the rivet head (7a). Consequently, such protruding rivet head (7a) not only looks quite objectionalble but also requires painting in a same color with that of lower rail (4), which furhter results in a complicated and laborsome assemblage.

SUMMARY OF THE INVENTION

It is a purpose of the present invention to provide an improved cover structure for a slide rail in a seat adjuster which makes more aesthetic the rear side of slide rail.

To achieve the purpose, according to the present invention, the cover member includes a rearward cap-like section and an elongated body section extending therefrom to cover a required length of slide rail, with a covering lug provided in the vicinity of a rived head at the rearward end side of the lower rail side.

Thus, at the length range of upper rail movable forwardly at limited point, the lower rail is covered with the cover member to make more aesthetic the rear side of slide rail as well as prevent the rivet head from being viewed from outside by virtue of the covering lug overlaying the head of rivet which connects together the lower rail and support leg member.

In one aspect of the invention, a latch projection formed in the cover member and a latch hole is formed in the lower rail, so that the engagement of the latch projection into the latch hole locks the cover member to the lower rail positively against removal therefrom.

In another aspect of the invention, the cover member may be formed at its lateral part with another cover section to overlie a par of the support leg member. This adds to the aesthetic appearance at the rear side of the seat.

DETAILED DESCRIPTION OF PREFERRED EMBODIMENTS OF THE INVENTION

With reference to FIGS. 3 through 6, there is illustrated a first embodiment of the present invention, wherein a cover structure for a slide rail is shown as being an improvement based upon the same slide rail associated with the same seat adjuster as in the previously stated prior art. Thus, all like designations given hereinafter correspond to all like ones used in the prior art description, and as such, specific explanation thereon is deleted for the sake of simplicity.

Figure 1:
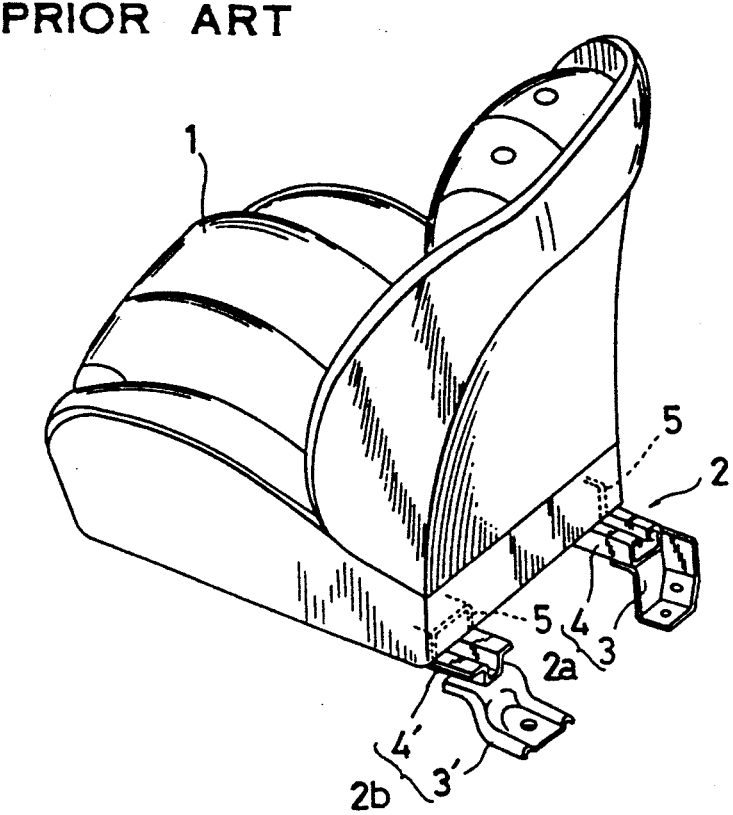
FIGS. 1 is a perspective view of a seat having a slide railes of seat adjuster.
Figure 2:
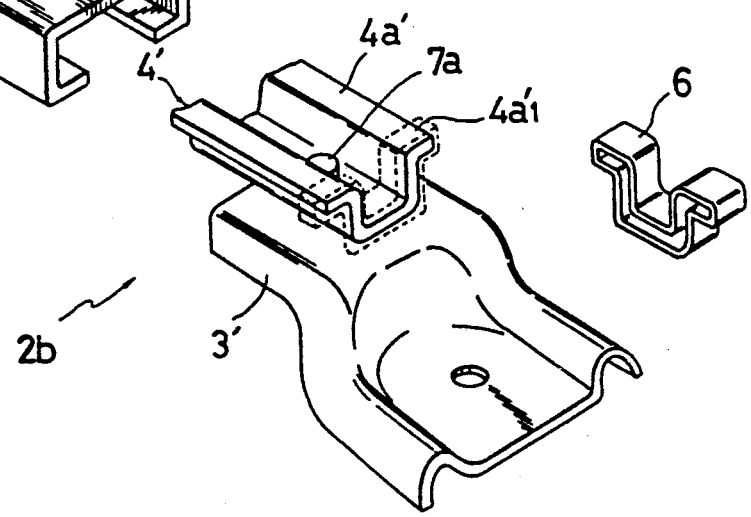
FIG. 2 is a partly broken perspective view of a conventional cover structure for covering the rearward end of lower rail of the seat adjuster.

In the present first embodiment, there is provided a cover member (16) which substantially covers the upper outer surfaces of the lower rail (4) along a required length thereof. Description will be made, in this embodiment, only with regard to the right-side slide rail (2a), as viewed from FIG. 1.

Figure 3:
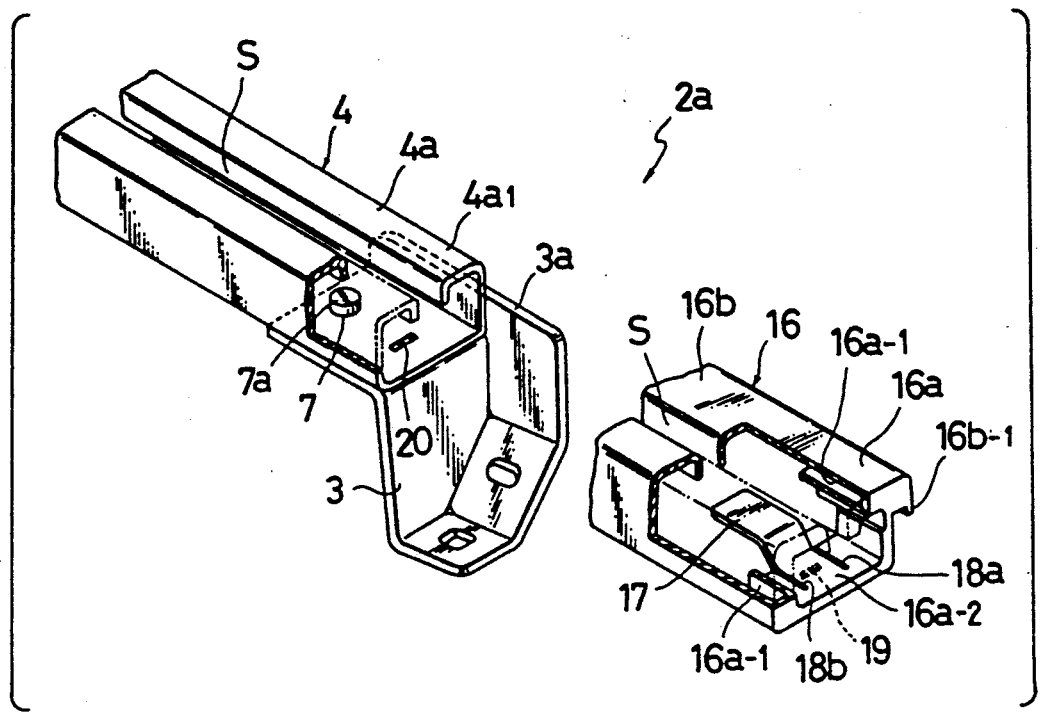
FIG. 3 is a partly broken perspective view of a cover structure for slide rail in accordance with the present invention.
Figure 4:
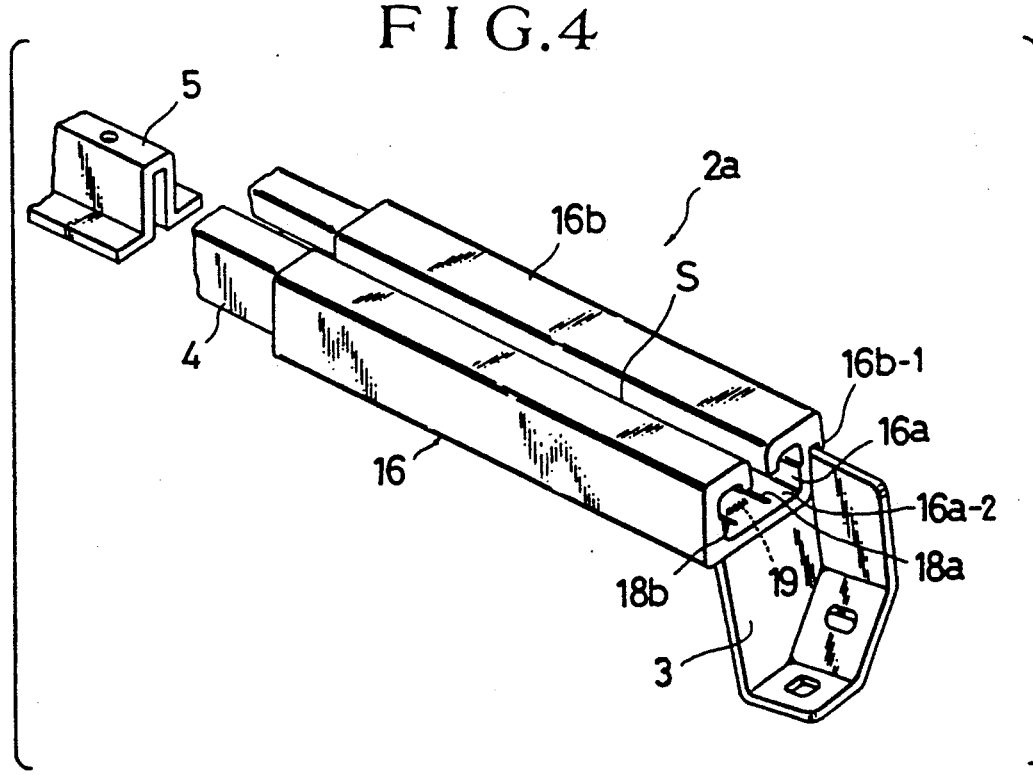
FIG. 4 is a partly broken perspective view of the cover structure.

The cover member (16) is basically comprised of a securing end portion (16a) and a cover body (16b), both of which are formed together integrally, as shown. The configuration of cover member (16) is such that its securing end portion (16a) is formed with an insertion slit (16a-1) opened inwardly thereof, of which the shape generally conforms to the vertical section of lower rail (4) (i.e. a generally "U" shape as best shown in FIG. 3); namely, the sectional shape of the terminal edge (4a1) of lower rail rearward part (4a), and that the bottom wall (16a-2) of securing end portion (16a) has a covering lug (17) which erects therefrom continuously, extending horizontally in a parallel relation with the flat bottom wall (4a) of lower rail (4) in a direction more inwardly of the cover member (16). Hence, centrally of upper wall of cover member (16), there runs an elongated spacing (S), through which the upper rail (5) projects upwardly for connection with the bottom of seat (1) and is slidable forwardly and backwardly.

The covering lug (17) is designed to overlie the head (7a) of rivet (7) which firmly connects together the upper rail (4) and leg member (3), to thereby prevent exposure of the rivet head (7a) into view from the outside through the elongated spacing (S). To serve such puporse, the covering lug (17) is disposed at and along a central longitudinal axi of the cover member (16), as in FIG. 3, and has a width greater than that of the spacing (S), with its height being at a level lower than the upper walls of both lower rail (4) and cover member (16), as can be seen from FIGS. 5 and 6.

Designation (19) denotes a latch projection which is formed on the lower side of base portion of the covering lug (17). The latch projection (19) is to be latched into a latch aperture (20) for locking the cover member (16) to the lower rail (4). A pair of incisions (18a)(18b) are formed at the base part of covering lug (17) in such a manner as to sandwich same as well as the latch projection (19), and those incisions (18a)(18b) serve to give an elastic spring nature around the latch projection (19) so that the latch projection may be vertically movable fro easy engagement into the latch aperture (20) when the cover member (16) is attached onto the lower rail (4). The lug (17) per se may therefore act as a lever for disengagement of the latch (19) from the aperture (20).

Figure 6:
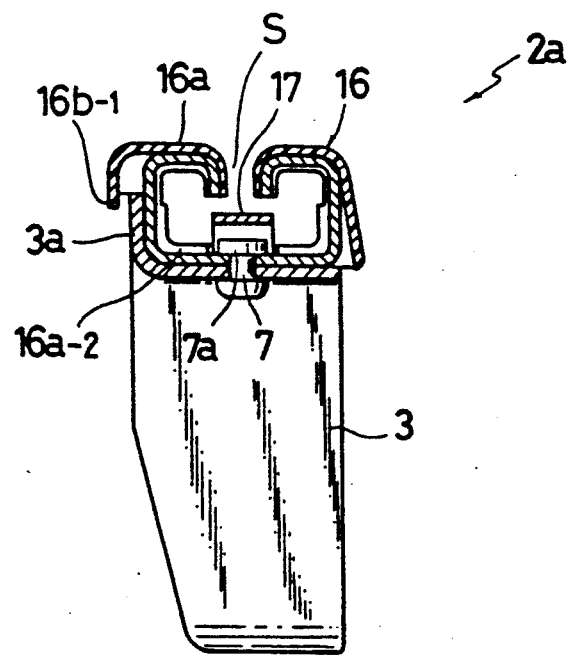
FIG. 6 is a sectinal view taken along the line A—A in the FIG. 5.

The support leg member (3) illustrated has a vertical lateral wall (3a) which extends up part-way to stand laterally of the lower rail (4). Hence, the cover member (16) is formed with a generally L-shaped protrusion (16b-1) at one later side corresponding to that vertical lateral wall (3a) of leg member (3) so that an upper covering or shield is provided above the vertical lateral wall (3a) for concealing the corresponding part from a view, as best seen in FIG. 6, which adds to an aesthetic appearance at the rearmost end of lower rail (4) as against the surrounding rearward apperance of leg member (3), as appreciable from FIG. 4.

Figure 5:
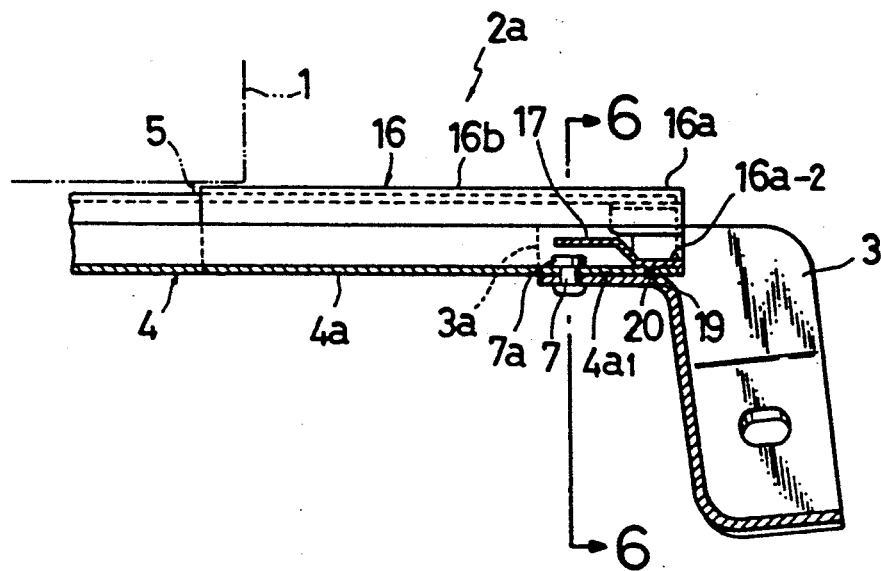
FIG. 5 is a sectional view of the same cover sturcture.

Looking at FIG. 5. it can be observed that the length of cover member (16) is determined at a degree such that the forward free end thereof is located a small distance more forwardly than the forward slide limit point at which the upper rail (5) is limited its foremost movable range. This permits the covering member (16) to still cover the lower rail (4), even when the seat (1) is moved forwardly, leaving exposed the rearward state of lower rail (4). Accordigly, the appearance of the lower rail (4) is improved aesthetically.

Figure 7:
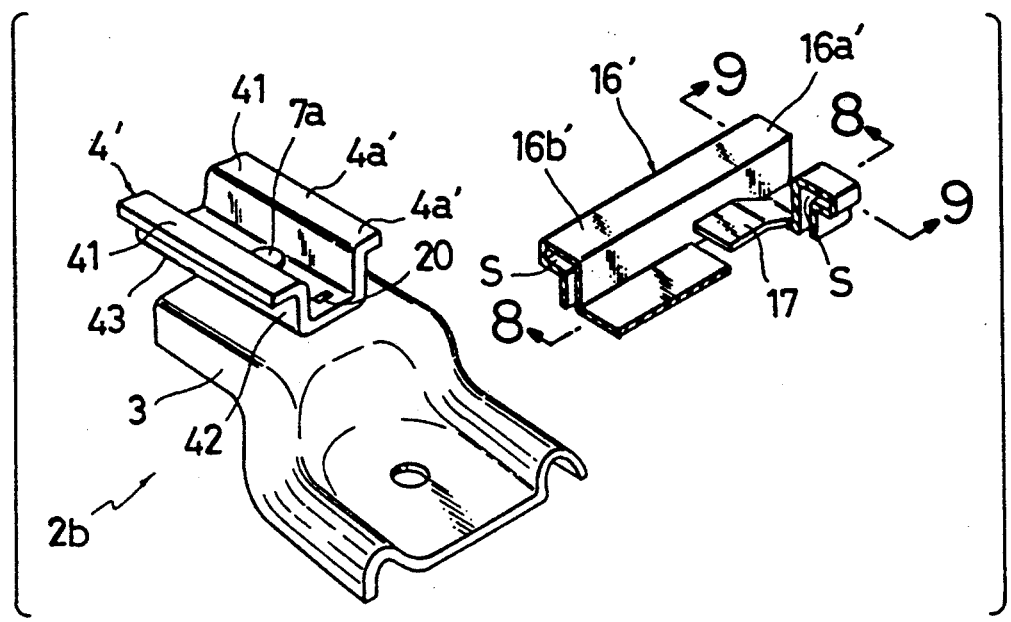
FIG. 7 is a partly broken, perspective view of a second embodiment of the invention.
Figure 8:
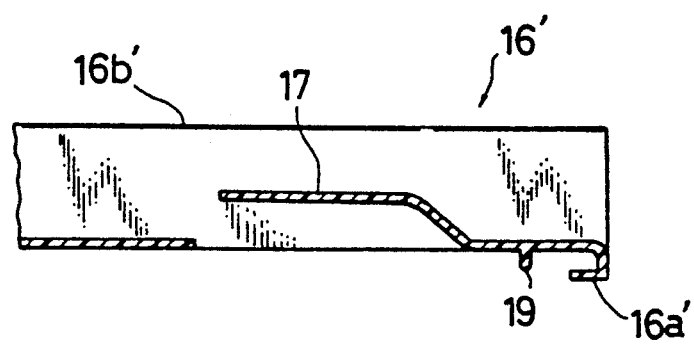
FIG. 8 is a sectional view taken along the line B—B in the FIG. 7.
Figure 9:
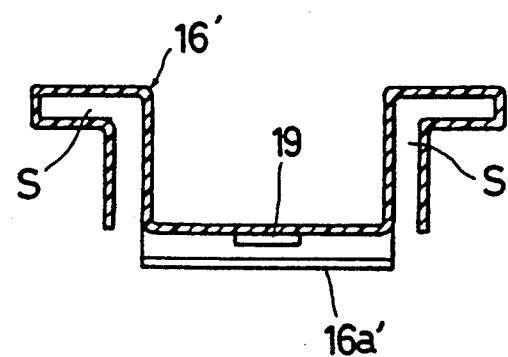
FIG. 9 is a sectional view taken along the line C—C in the FIG. 7.

FIGS. 7, 8 and 9 show a second embodiment of the present invention, which is directed to another lower rail (4') disposed opposite to the foregoing lower rail 4. The second lower rail (4') is shaped in a configuration comprising a pair of horizontally extending sections (41), a par of lateral vertical sections (42), each integrally extending from the respective two horizontally extending sections (41), and a bottom section (43). In this particular embodiment, therefore, there is provided another mode of cover member (16') whose configuration in secion conforms generally to that of lower rail (4'), except for the lower rail bottom section (43). An inner spacing (S) is defined on the opposite sides of the cover member (16') whose configuration assumes a generally inverted L shape so as to cover the outer surfaces of corresponding sections (41, 42) of lower rail (4). Like the cover member (16) of the first embodiment, it is noted that the length of this cover memer (16') is determined at a degree such that the forward free end thereof is located a small disstance more forwardly than the forward slide limit point at which the upper rail (5) is limited its foremost movable range.

Further, like the first embodimemt, the latch projection (19) is formed on the lower surface of the cover member (16') in the neighborhood of the rearward cap end portion (16a') and the latch aperture (20) is formed in the rearward end portion of the lower rail (4'), for the same latching purpose as in the first embodiment. As such, the same covering lug (17) is provided at that rearward end portion of cover member (16') for concealing the rivet head (7a) at the lower rail (4'). Designation (16a'1) denotes a securing lug to be inserted beneath the rearward end portio of the lower rail (4').

From the descriptions above, it is appreciated that, according to the present invention, both rearward end portions of cover members (16)(16') and head of rivet (7a) are covered to prevent their exposures into view from outside, thus improving an appearance of rearward side of seat, and also eliminating any subsequent process for treating the rivet head (7a), which facilitates the assemblage and lowers costs involved.

The present invention is not limited to the illustrated embodiment, but any other modifications, replacements and additions may structurally be possible without departing from the scopes and spirits of the appended claims. For example, both cover members (16)(16') may not be formed with such elongated body (16b)(16b'), or rather may only be formed with their respective cap-like securing portions (16a)(16a') and securing lugs (17). The cover members (16)(16') per se may be formed from a synthetic resin material, metallic plate material, or the like.

What is claimed is:

1. A cover structure for a slide rail of a seat adjuster, wherein said slide rail includes an upper rail on which a seat is mounted and a lower rail slidably fitted to said upper rail such that said upper rail may be moved forwardly and backwardly along said lower rail, said lower rail being fixed via a support leg member on a floor side, wherein said support leg member is fixed to a rearward end portion of said lower rail by means of a rivet, and wherein a cover member is provided at said rearward end portion of said lower rail which is to be left exposed when said upper rail is moved forwardly along said lower rail, characterized in that said cover member i$ integrally formed with a means for overlaying said rivet to prevent the same from being viewed from outside.

2. The cover structure as defined in claim 1, wherein said cover member comprises a cap-like securing section capable of fitting over an end of said rearward end portion of said lower rail, and a cover body section to cover said lower rail, said cover body section having such a length which extends to a degree that a forward free end of said cover member opposite to said securing section is located a small distance more forwardly than a forward slide limit point at which said upper rail is limited its foremost movable range, and wherein said means for overlaying said rivet comprises a lug which is integrally formed in said securing section of said cover member such as to overlie said rivet.

3. The cover structure as defined in claim 1, wherein said cover member is integrally formed with a latch projection, and wherein a latch aperture is formed in said lower rail, with such an arrangement that said latch projection is engaged into said latch aperture for securing said cover member to said lower rail.

4. The cover structure as defined in claim 1, wherein said cover member is integrally formed with a means for covering a part of said support leg member so as to aesthetically improve an appearance at rearward side of said seat.

* * * * *